J. R. ARMSTRONG.
NUT LOCK.
APPLICATION FILED MAY 14, 1910.
975,012.
Patented Nov. 8, 1910.
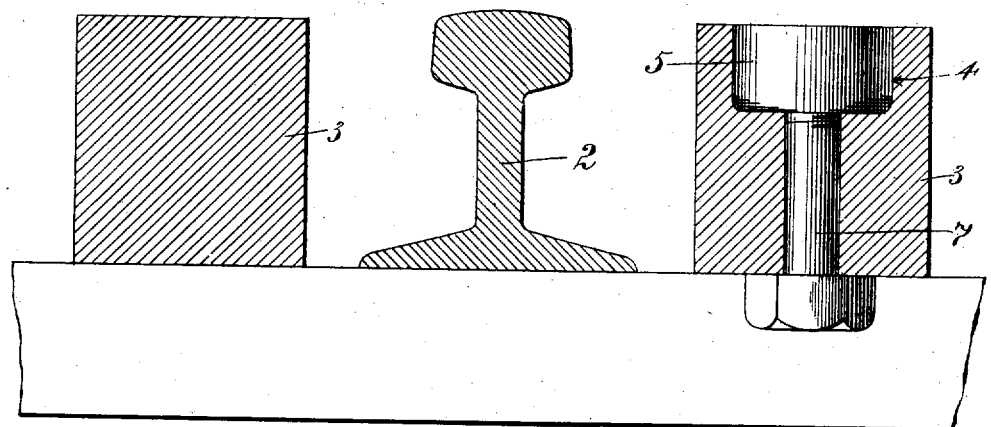
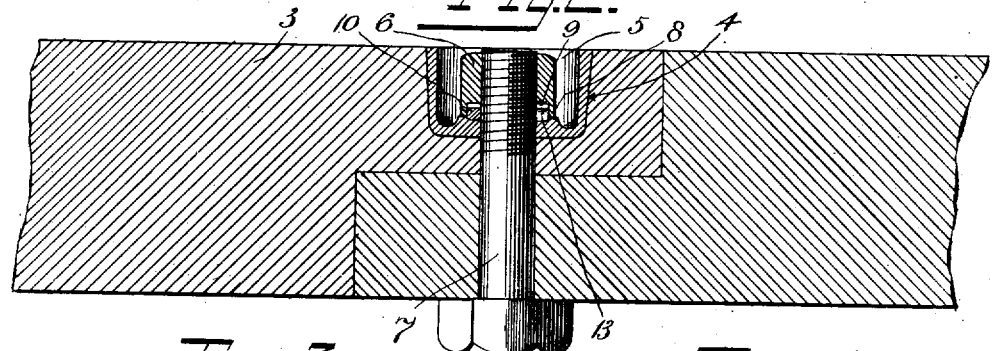
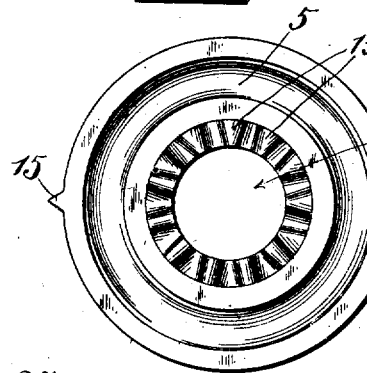
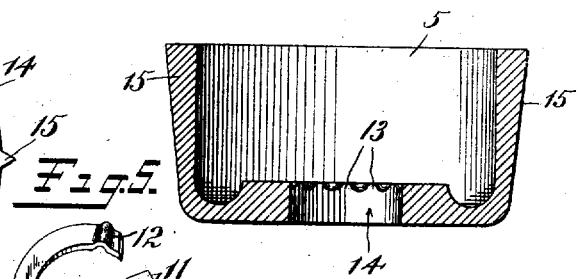
Witnesses:
Inventor
J. R. ARMSTRONG

UNITED STATES PATENT OFFICE.

JOHN R. ARMSTRONG, OF PROVIDENCE, RHODE ISLAND, ASSIGNOR TO THE O. K. NUT LOCK COMPANY, OF PROVIDENCE, RHODE ISLAND, A CORPORATION OF RHODE ISLAND.

NUT-LOCK.

975,012. Specification of Letters Patent. Patented Nov. 8, 1910.

Application filed May 14, 1910. Serial No. 561,310.

*To all whom it may concern:*

Be it known that I, JOHN R. ARMSTRONG, a citizen of the United States, residing at Providence, county of Providence, State of Rhode Island aforesaid, have invented certain new and useful Improvements in Nut-Locks, of which the following is a full, clear, and exact description.

My invention relates to nut locks and is particularly concerned with improvements in a so-called locking cup-washer adapted to be countersunk in a suitable socket in a wooden beam, such for example as a guard rail for railway tracks.

The object of the invention is to provide means to prevent the rotation of the washer when the nut is turned up or unscrewed.

With this object in view, the invention consists in the construction and arrangement of parts, a preferred embodiment of which is illustrated in the accompanying drawings, in which—

Figure 1 is a cross-sectional view of a guard rail in conjunction with a railway rail, showing the locking washer and bolt in elevation. Fig. 2 is a longitudinal sectional view at the junction of the sections of the guard rail, showing the washer, nut and locking means in section and bolt in elevation. Fig. 3 is a plan view of the improved washer. Fig. 4 is a cross-sectional view thereof. Fig. 5 is a view of a resilient split locking ring for locking the nut and washer together.

In the embodiment of my invention herein selected for illustration, 1 indicates one of the ties carrying the railway rail 2. 3—3 indicate guard rails arranged upon either side of said railway rail. The guard rail is provided at the junction with an adjacent section with a socket 4 to receive a cup-washer 5.

6 indicates a lock nut, secured upon the bolt 7, said nut having a depending flange 8, forming an annular recess 9 within which is contained a resilient split locking ring 10, said ring having projections 11 and 12 upon its opposite ends respectively, the projection at one end extending from one side and the projection at the other end extending from the other side of the ring. The recess 9 of the nut is provided with a plurality of radial corrugations and the bottom of the washer 5 is also provided with a corresponding series of radial corrugations 13 around the bolt receiving bore 14 of the washer. When the nut is turned up on the bolt with the locking ring 10 interposed between the nut and the washer, one of the projections of said ring engages the corrugations on the nut and the other the corrugations 13 on the washer, whereby said nut and washer are locked against incidental release.

In order to prevent rotation of the cup-washer when the nut is turned up, the side walls of said washer are provided with one or more exterior locking ribs 15, which, when the washer is driven home into the socket 4, are embedded in the side walls of the socket, whereby said washer effectively resists all tendency to turn from the turning up and locking of the nut in position.

While I have herein described a particular embodiment of my invention, the same may be varied in detail and arrangement of parts within the scope of the appended claims.

What I claim is:

1. In a nut lock, the combination of a nut, a cup shaped washer therefor adapted to be seated in a socket of the member to be secured, locking means interposed between the nut and the washer and means arranged exteriorly of the side walls of the washer adapted to engage the sides of said socket to prevent rotation of the washer.

2. In a nut lock, the combination of a nut, a cup shaped washer therefor adapted to be seated in a socket of the member to be secured, locking means interposed between the nut and the washer, and one or more holding ribs projecting exteriorly of the walls of said washer adapted to be embedded within the walls of said socket to prevent rotation of said washer.

3. In a nut lock, the combination of a nut, a cup shaped washer therefor adapted to be seated in a socket of the member to be secured, locking means interposed between said nut and the washer, said washer having means at its perimeter to engage the walls of said socket to prevent rotation of said washer.

4. As an article of manufacture, a cup shaped washer adapted to be seated in a socket of the member to be secured, and having means at its perimeter to engage the walls of said socket to prevent rotation of the washer.

5. As an article of manufacture, a cup shaped washer adapted to be seated in a socket of the member to be secured, said washer having one or more ribs on its exterior walls adapted to be embedded in the walls of said socket to prevent rotation of the washer.

6. As an article of manufacture, a cup shaped washer adapted to be seated in a socket of the member to be secured, said washer having nut-locking means at its base and having means at its perimeter adapted to engage the walls of said socket to prevent rotation of the washer.

JOHN R. ARMSTRONG.

Witnesses:
CHAS. A. PEARD,
R. C. POWELL.